United States Patent [19]
Nakayama et al.

[11] Patent Number: 6,104,548
[45] Date of Patent: *Aug. 15, 2000

[54] ZOOM LENS

[75] Inventors: Hiroki Nakayama, Sagamihara; Masatake Kato, Kunitachi, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/563,749

[22] Filed: Nov. 29, 1995

Related U.S. Application Data

[63] Continuation of application No. 08/086,854, Jul. 7, 1993, abandoned.

[30] Foreign Application Priority Data

Jul. 8, 1992 [JP] Japan .................................... 4-181103

[51] Int. Cl.⁷ .................................................. G02B 15/14
[52] U.S. Cl. ............................................ 359/690; 359/785
[58] Field of Search ...................... 359/690, 785

[56] References Cited

U.S. PATENT DOCUMENTS

| | | | |
|---|---|---|---|
| 3,415,592 | 12/1968 | Price | 359/690 |
| 3,944,324 | 3/1976 | Tajima | 350/16 |
| 3,972,592 | 8/1976 | Ruben | 359/690 |
| 4,118,108 | 10/1978 | Muszumanski | 359/690 |
| 4,449,791 | 5/1984 | Terasawa | 359/690 |
| 4,465,342 | 8/1984 | Tanaka et al. | 359/690 |
| 4,763,998 | 8/1988 | Tsuji et al. . | |
| 4,776,679 | 10/1988 | Kitagishi et al. . | |
| 4,842,386 | 6/1989 | Kitagishi et al. . | |
| 4,854,681 | 8/1989 | Kato et al. . | |
| 4,874,232 | 10/1989 | Hasegawa | 359/690 |
| 5,078,481 | 1/1992 | Nakayama et al. . | |
| 5,204,780 | 4/1993 | Sakamoto | 359/690 |
| 5,221,996 | 6/1993 | Kikuchi | 359/690 |
| 5,260,834 | 11/1993 | Smibata et al. | 359/690 |
| 5,570,234 | 10/1996 | Shibata | 359/690 |

FOREIGN PATENT DOCUMENTS

| | | |
|---|---|---|
| 51-56645 | 5/1976 | Japan . |
| 51-68244 | 6/1976 | Japan . |
| 63-304218 | 12/1988 | Japan . |

Primary Examiner—Georgia Epps
Assistant Examiner—Evelyn A. Lester
Attorney, Agent, or Firm—Fitzpatrick, Cella, Harper & Scinto

[57] ABSTRACT

A zoom lens has, in succession from the object side, a first lens unit having positive refractive power, a second lens unit having negative refractive power, and a third lens unit having positive refractive power. The second and third lens units are moved to thereby effect zooming. When variations in the magnifications of the second and third lens units from the wide angle end to the telephoto end are $Z_2$ and $Z_3$, respectively, the zoom lens satisfies the condition that $Z_3/Z_2 > 1.4$. The zoom lens is compact and yet covers a wide angle range of an angle of view of 60°–80°.

19 Claims, 9 Drawing Sheets

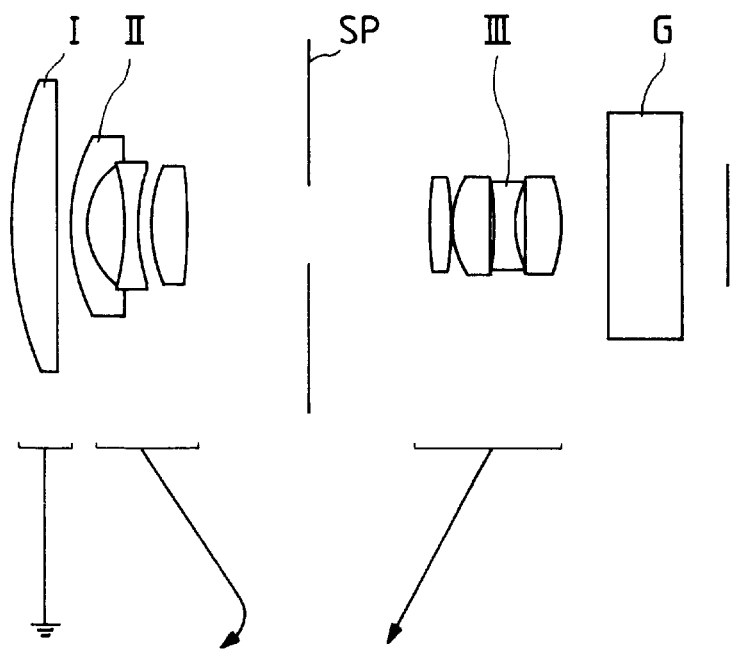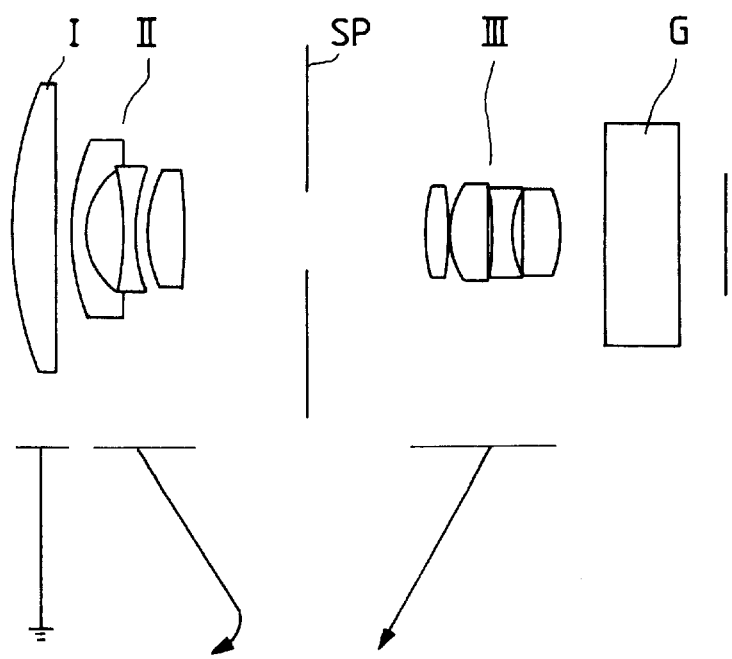

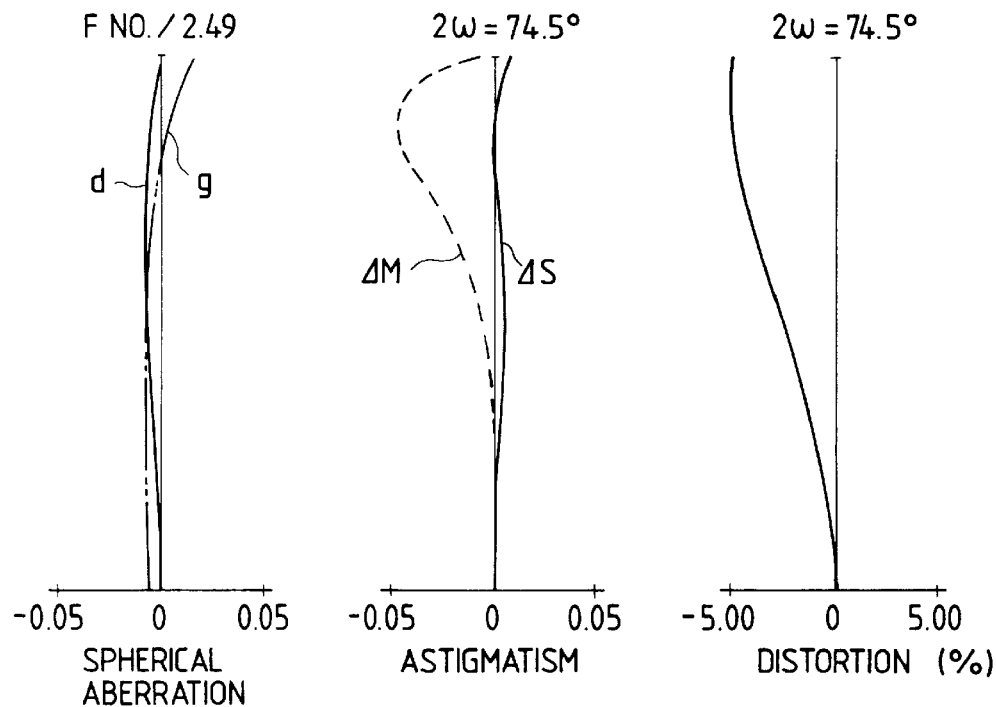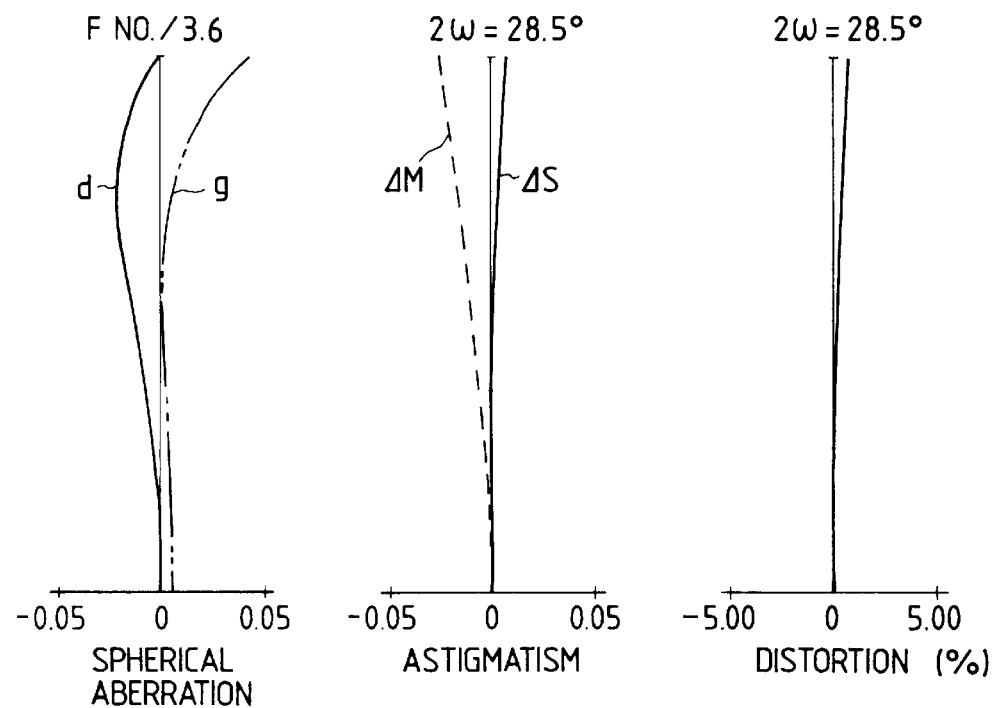

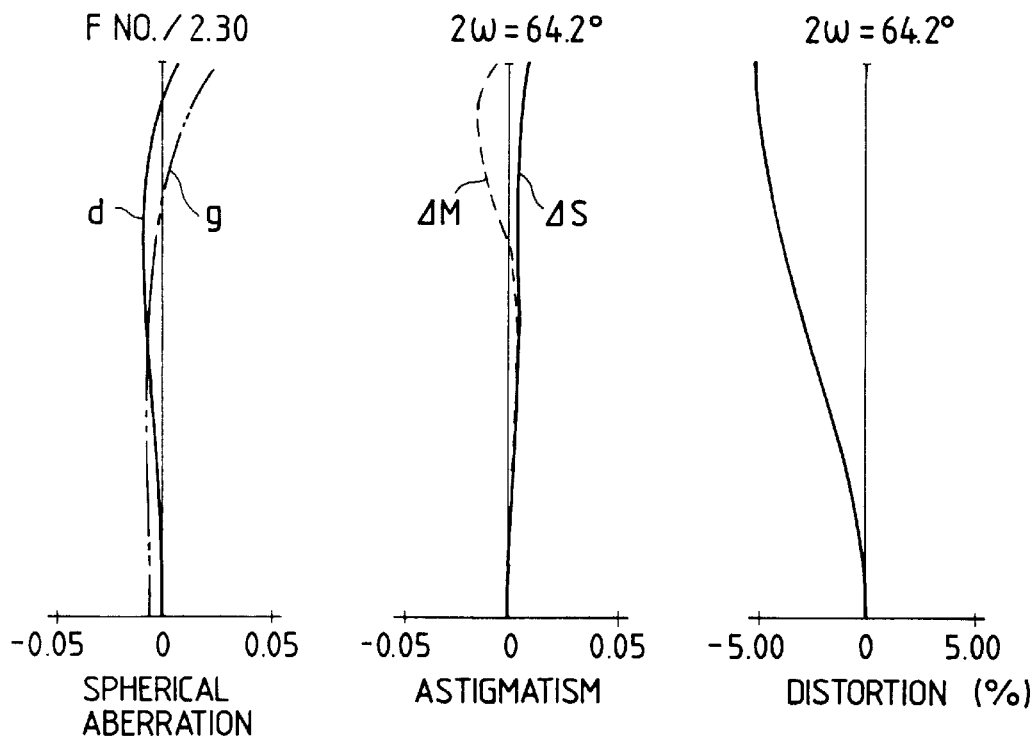
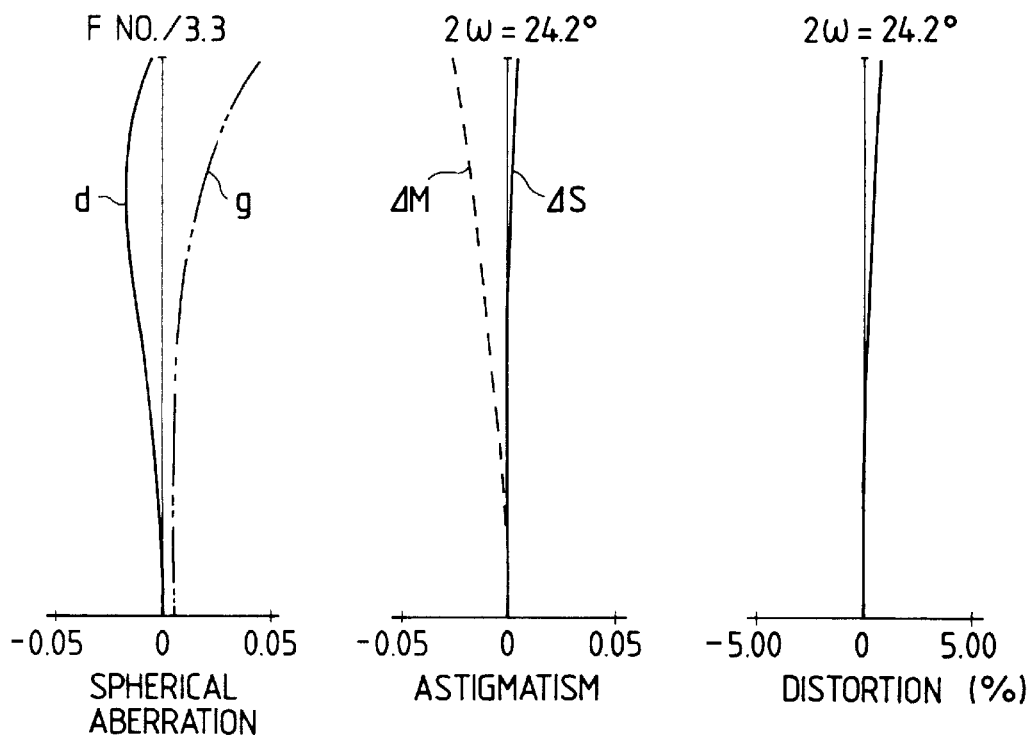

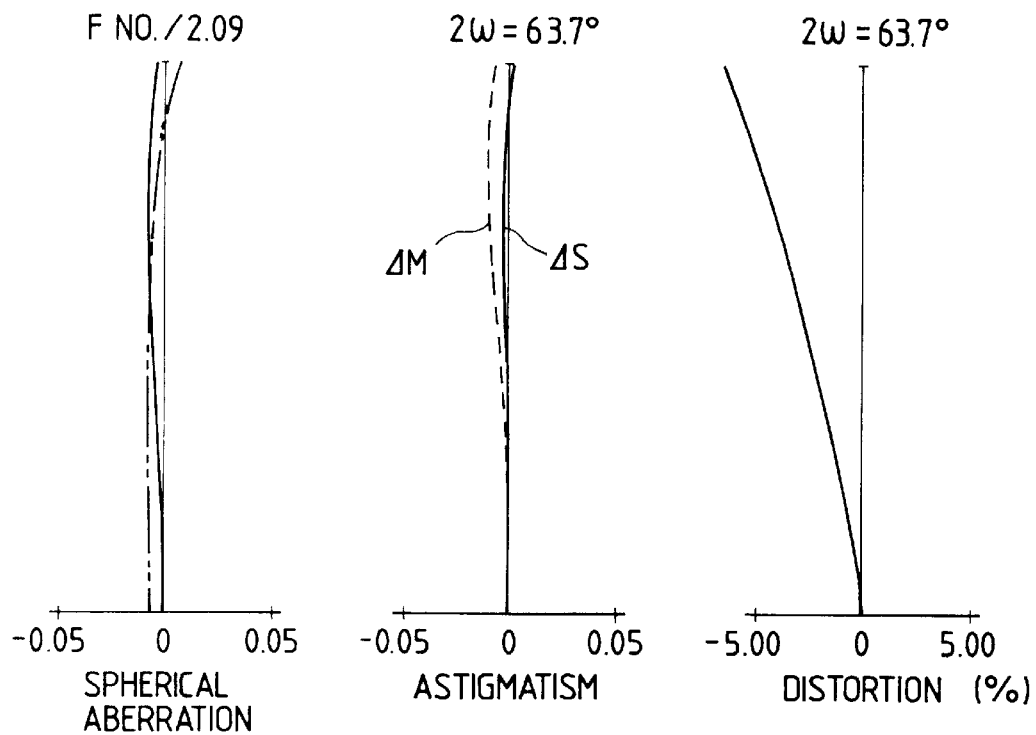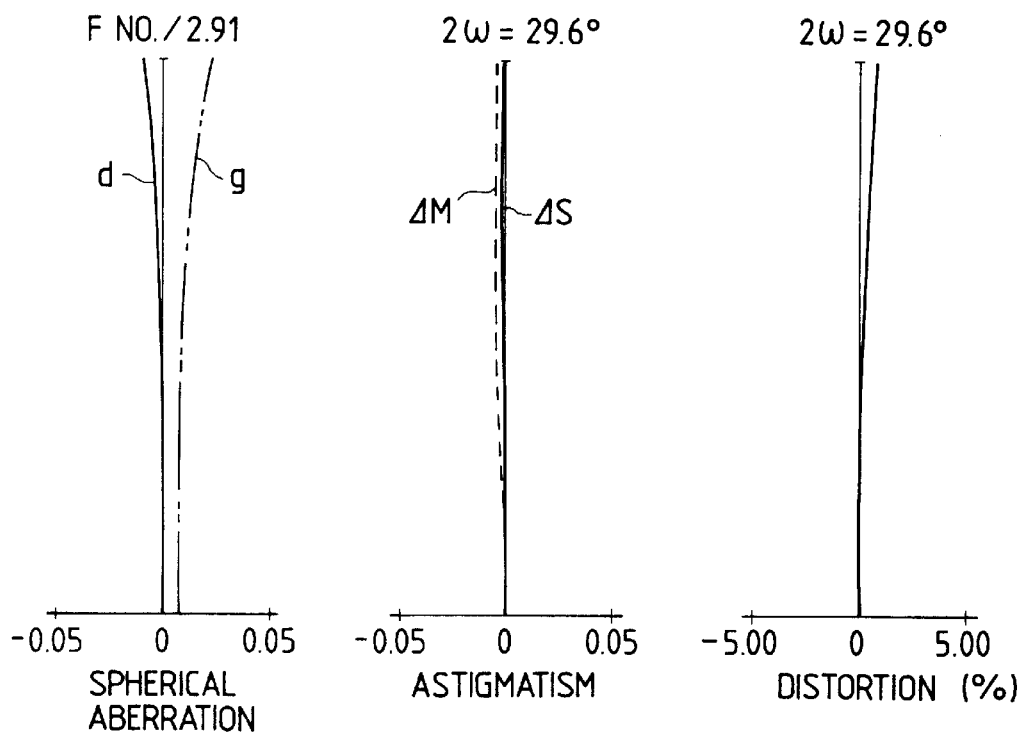

F NO./2.3

-0.05  0  0.05
SPHERICAL ABERRATION

2ω = 74.4°

-0.05  0  0.05
ASTIGMATISM

2ω = 74.4°

-5.00  0  5.00
DISTORTION (%)

F NO./3.6

-0.05  0  0.05
SPHERICAL ABERRATION

2ω = 21.6°

-0.05  0  0.05
ASTIGMATISM

2ω = 21.6°

-5.00  0  5.00
DISTORTION (%)

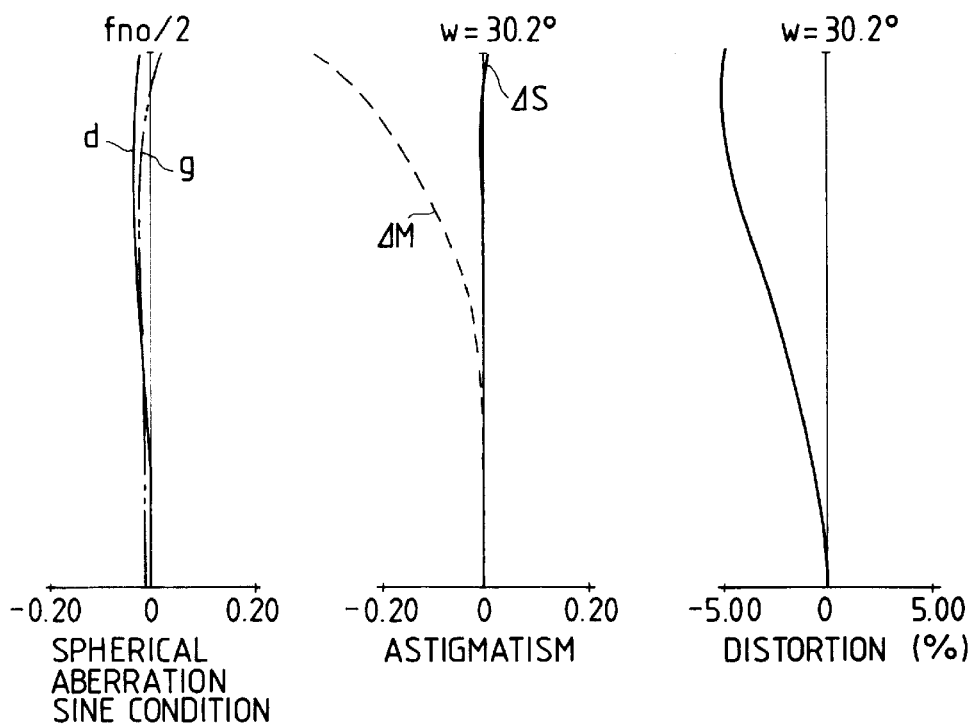
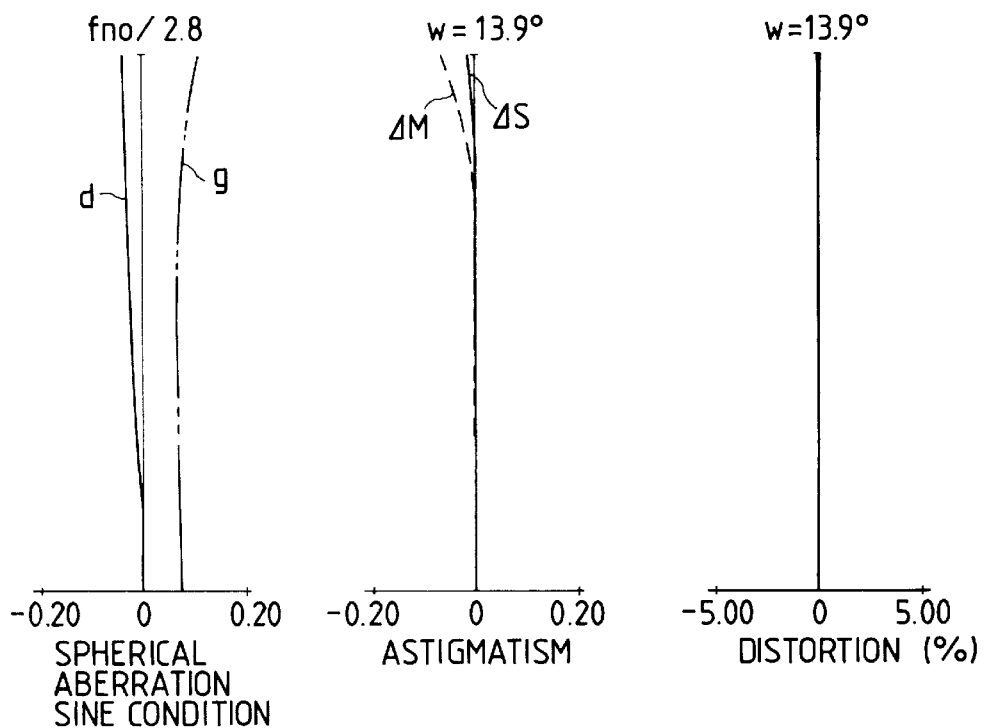

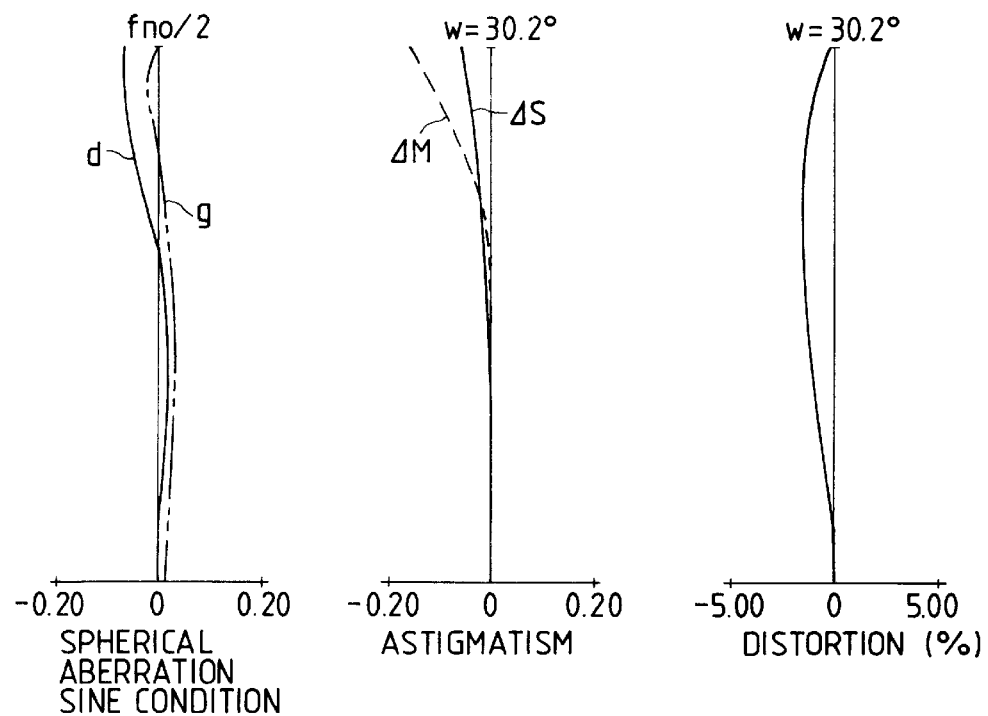
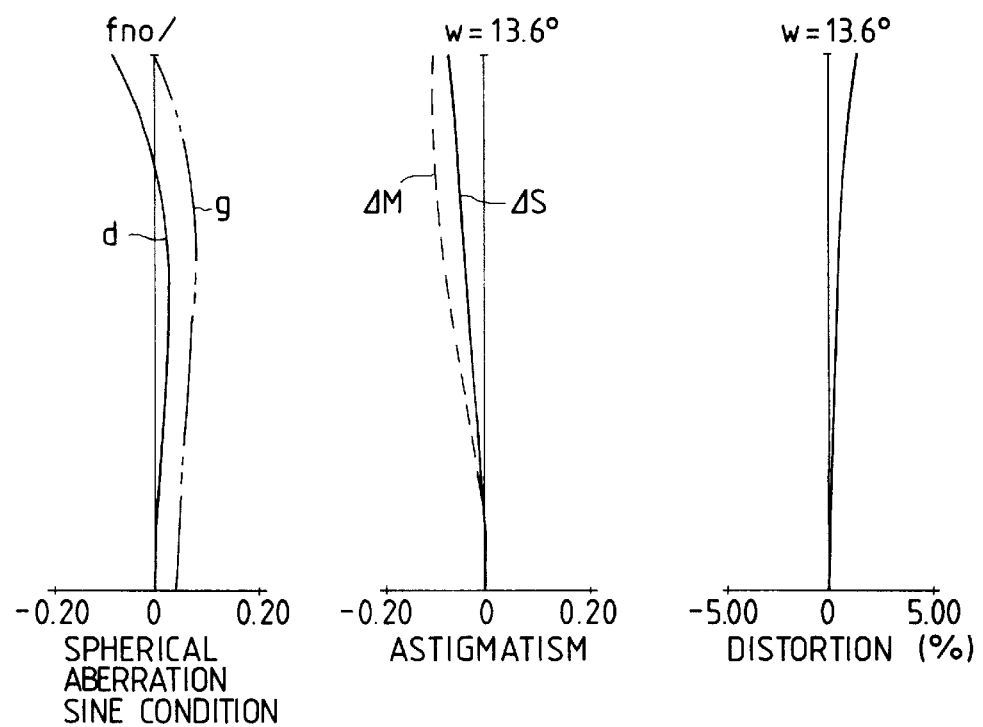

ZOOM LENS

This application is a continuation of application Ser. No. 08/086,854 filed Jul. 7, 1993, now abandoned.

BACKGROUND OF THE INVENTION

1. Field of the Invention

This invention relates to a zoom lens suitable for a camera for photographic film, a video camera and a still video camera, and particularly to a compact zoom lens of three-unit construction.

2. Related Background Art

In recent years, with the tendency of home video cameras toward compactness and light weight, compactness and lighter weight and particularly, a shorter full length and reduced diameter of the front lens have been required of not only camera bodies, but also zoom lenses.

On the other hand, with the compactness of zoom lenses, demand is increasing for zoom lenses in which the angle of view at the wide angle end covers a wide angle range of the order of 60°–80°.

Zoom lenses which have, in succession from the object side, a first lens unit having positive refractive power, a second lens unit having negative refractive power and a third lens unit having positive refractive power and in which the second lens unit and third lens unit are moved to thereby effect zooming are disclosed, for example, in Japanese Laid-Open Patent Application No. 51-56645, Japanese Laid-Open Patent Application No. 51-68244 and Japanese Laid-Open Patent Application No. 63-304218.

These zoom lenses, however, could hardly be said to satisfy the aforementioned requirement, i.e., the requirement for being compact and yet securing a sufficiently wide angle range.

SUMMARY OF THE INVENTION

The object of the present invention is to provide a zoom lens which is compact and yet covers a wide angle range, and the feature of the present invention is that the zoom lens has, in succession from an object side, a first lens unit having positive power, a second lens unit having negative refractive power and a third lens unit having positive refractive power, the second lens unit and the third lens unit being moved to thereby effect zooming, and when variations in the magnifications of the second lens unit and the third lens unit from the wide angle end to the telephoto end are $Z_2$ and $Z_3$, respectively, the zoom lens satisfies the following condition:

$$\frac{Z_3}{Z_2} > 1.4$$

BRIEF DESCRIPTION OF THE DRAWINGS

FIG. 1 is a cross-sectional view of a zoom lens according to a first embodiment of the present invention.

FIGS. 2A-1, 2A-2, 2A-3, 2B-1, 2B-2 and 2B-3 show aberrations in the zoom lens according to the first embodiment.

FIG. 3 is a cross-sectional view of a zoom lens according to a second embodiment of the present invention.

FIGS. 4A-1, 4A-2, 4A-3, 4B-1, 4B-2 and 4B-3 show aberrations in the zoom lens according to the second embodiment.

FIGS. 6A-1, 6A-2, 6A-3, 6B-1, 6B-2 and 6B-3 show aberrations in the zoom lens according to the third embodiment.

FIGS. 8A-1, 8A-2, 8A-3, 8B-1, 8B-2 and 8B-3 show aberrations in the zoom lens according to the fourth embodiment.

FIGS. 10A-1, 10A-2, 10A-3, 10B-1, 10B-2 and 10B-3 show aberrations in the zoom lens according to the fifth embodiment.

FIGS. 12A-1, 12A-2, 12A-3, 12B-1, 12B-2 and 12B-3 show aberrations in the zoom lens according to the sixth embodiment.

DESCRIPTION OF THE PREFERRED EMBODIMENTS

Figure 5:
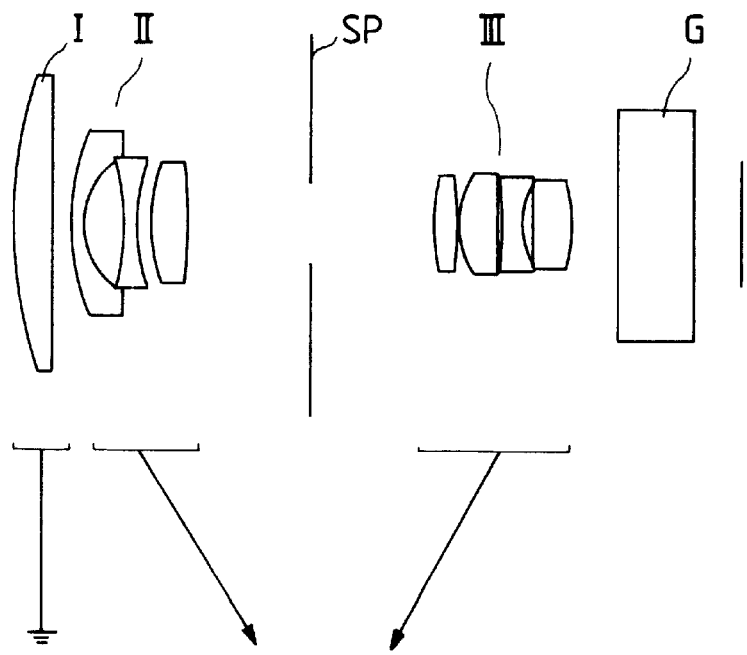
FIG. 5 is a cross-sectional view of a zoom lens according to a third embodiment of the present invention.
Figure 7:
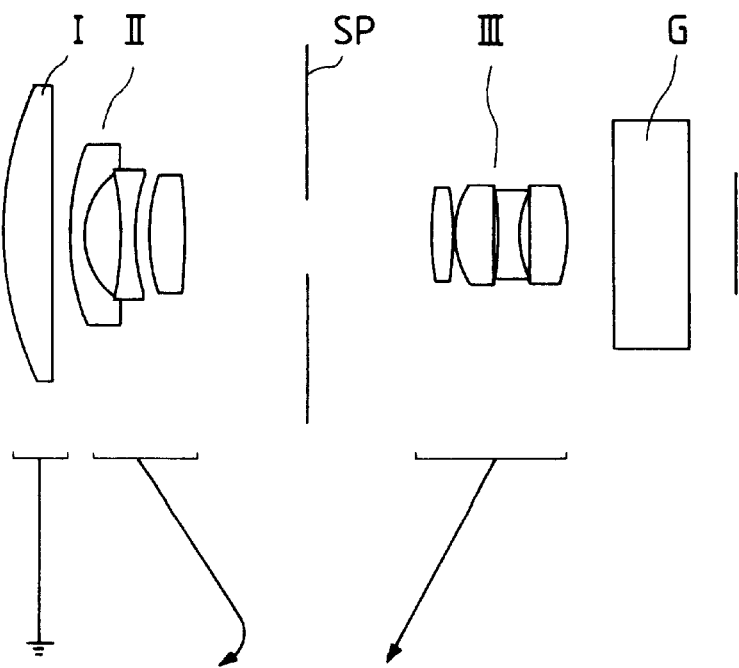
FIG. 7 is a cross-sectional view of a zoom lens according to a fourth embodiment of the present invention.
Figures 1, 8A:
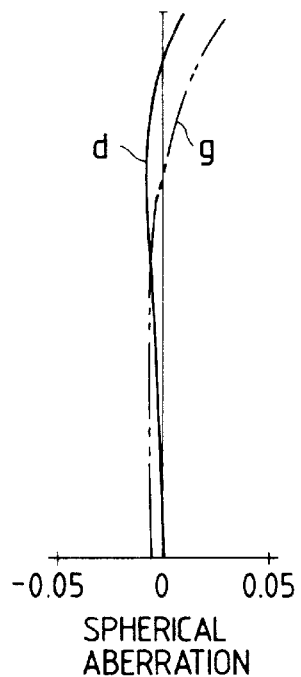
Figures 2, 8A:
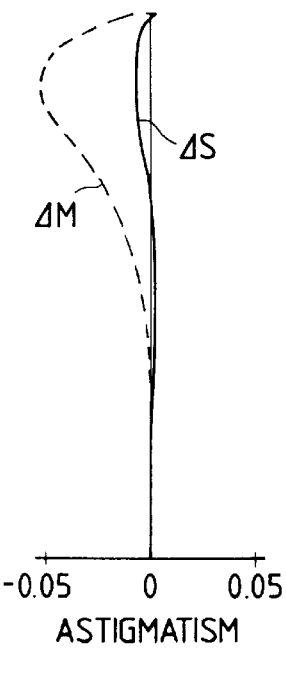
Figures 3, 8A:
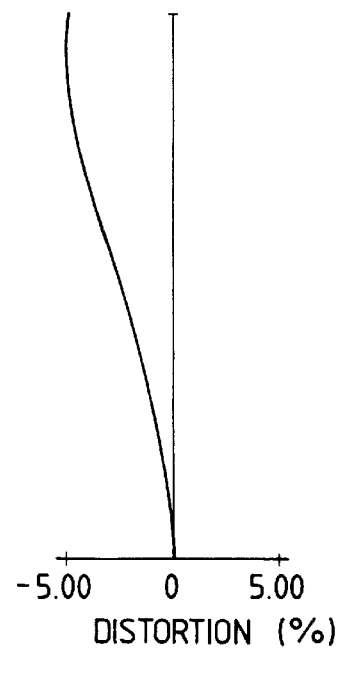
Figures 1, 8B:
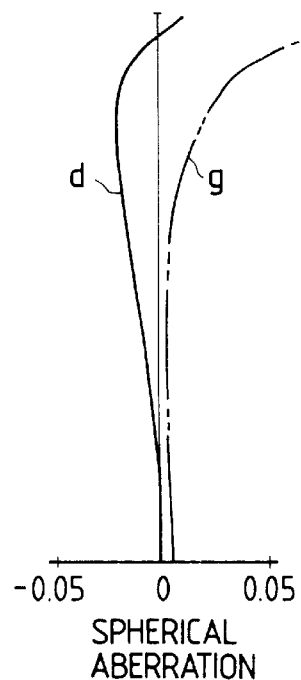
Figures 2, 8B:
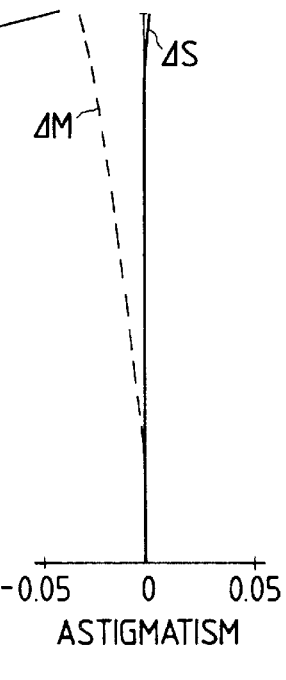
Figures 3, 8B:
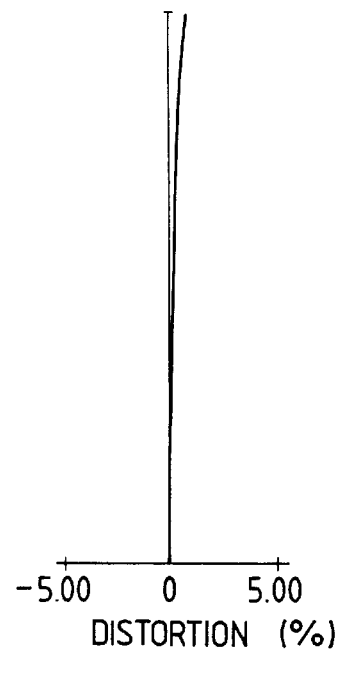
Figure 9:
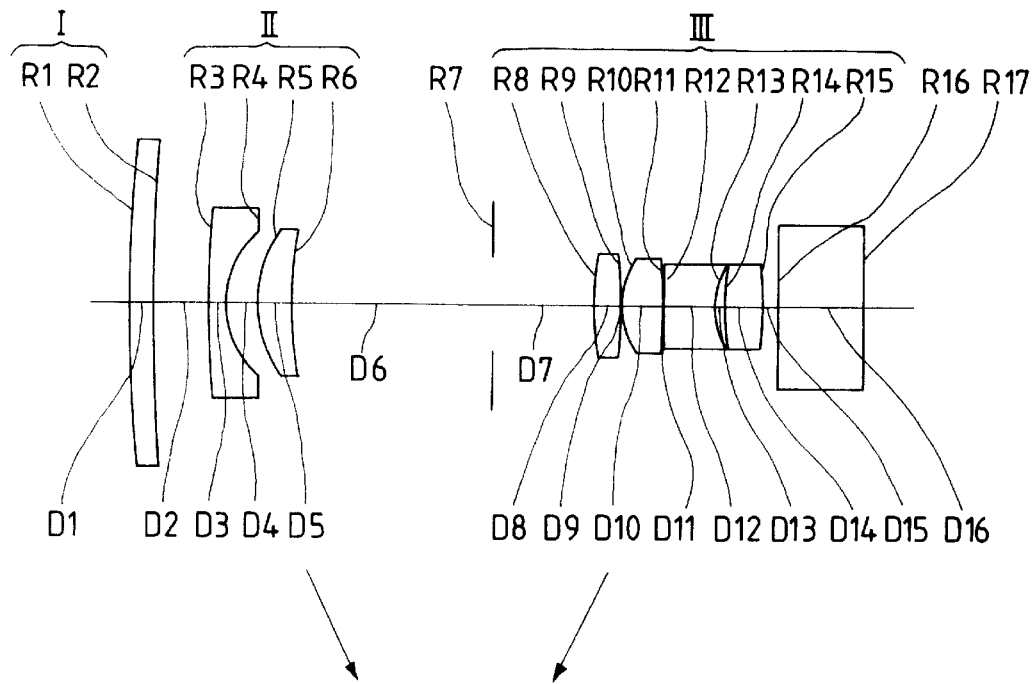
FIG. 9 is a cross-sectional view of a zoom lens according to a fifth embodiment of the present invention.
Figure 11:
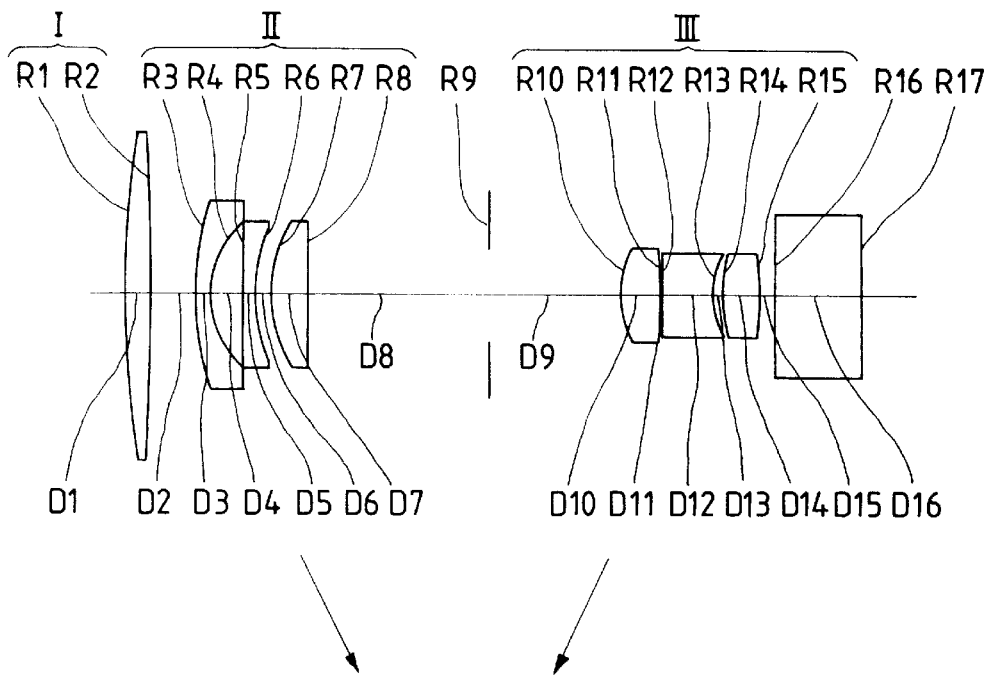
FIG. 11 is a cross-sectional view of a zoom lens according to a sixth embodiment of the present invention.

FIGS. 1, 3, 5, 7, 9 and 11 are cross-sectional views of zoom lenses according to the present invention. The reference character I designates a first lens unit having positive refractive power, the reference character II denotes a second lens unit having negative refractive power, the reference character III designates a third lens unit having positive refractive power, and the reference character SP denotes a stop. During zooming from the wide angle end to the telephoto end, the second lens unit and the third lens unit are moved along zoom loci as indicated by the arrow. During the zooming, the first lens unit remains stationary. The reference character G designates a filter member such as an infrared cut filter or an optical low-pass filter.

When variations in the magnifications of the second lens unit and the third lens unit from the wide angle end to the telephoto end are $Z_2$ and $Z_3$, respectively, the following condition is satisfied:

$$\frac{Z_3}{Z_2} > 1.4 \qquad (1)$$

The conditional formulation (1) prescribes the ratio of the magnification variation to the zooming of the second lens unit and the third lens unit, and is a condition for achieving the wide angle and compactness of a zoom lens of three-unit construction, and yet correcting aberrations, particularly distortion and curvature of image field, well. If this range is departed from, the amount of movement of the second lens unit will tend to become great in order to obtain a desired zoom ratio, and if moreover, an attempt is made to shorten the focal length at the wide angle end, i.e., to achieve a wide angle, the diameter of the front lens as the first lens unit will tend to become large. Further, the negative refractive power of the second lens unit will become strong, and at the wide angle end, barrel-shaped distortion and Petzval sum will be in the negative direction, and the image plane will tend to become over.

Also, to secure the angle of view widely in a wide angle state, it is desirable that the following conditional expression be satisfied:

$$1.40<|F_2/F_W|<2.60, \tag{2}$$

where $F_2$ is the focal length of the second lens unit, and $F_W$ is the focal length of the whole system at the wide angle end. If this range is departed from, it will become difficult to draw near the wide angle side and yet maintain a good performance. If the upper limit of this conditional expression is exceeded, the diameter of the front lens will become large or the amount of movement of the second lens unit will become great, and this is not suitable for compactness. Also, if the lower limit of this conditional expression is exceeded, the refractive power of the second lens unit will become too strong and Petzval sum will become great in the negative direction and thus, the fluctuation of the image plane will become unable to be eliminated.

Further, to optimize the sharing of magnification change by the lens units, it is preferable that the amounts of movement of the lens units satisfy the following conditional expressions:

$$0.5<|M_2|/(F_T-F_W)<1.6 \tag{3}$$

$$0.5<|M_3|/(F_T-F_W)<1.0, \tag{4}$$

where $M_2$ and $M_3$ are respectively the amounts of movement of the second lens unit and the third lens unit during the zooming from the wide angle end to the telephoto end, and $F_T$ is the focal length of the whole system at the telephoto end.

If these ranges are departed from, the sharing of magnification change by the lens units will not only become ill-balanced, but also the size of the zoom lens and aberrations created in each lens unit will be affected. If the upper limits of these expressions (3) and (4) are exceeded, the whole system will become bulky, and if the lower limits of these expressions are exceeded, the amounts of movement for obtaining a desired magnification ratio will become small and it will become necessary to strengthen the refractive power of each lens unit and the correction of aberrations will become difficult.

Further, it is desirable that the amounts of movement of the lens units be within the following range:

$$0.7<|M_2/M_3|<2.5 \tag{5}$$

If this range is departed from, the whole system will become large and the balance of the sharing of magnification change by the lens units will be aggravated, and this is not suitable.

Also, to set the focal length at the wide angle side shortly, it is desirable that the following conditional expressions be further satisfied:

$$5<F_1/F_W<53 \tag{6}$$

$$1<F_3/F_W<3 \tag{7}$$

$$0.4<E_{1W}/F_W<1.8, \tag{8}$$

where $F_1$ and $F_3$ are respectively the focal lengths of the first lens unit and the third lens unit and $E_{1W}$ is the principal point spacing between the first lens unit and the second lens unit at the wide angle end.

Conditional expression (6) is concerned in the refractive power of the first lens unit, and if the upper limit of this conditional expression is exceeded, it will become difficult to correct barrel-shaped distortion. Also, if the lower limit of this conditional expression is exceeded, the refractive power of the first lens unit will become strong and Petzval sum will tend to assume a positive value and the image plane will tend to become under.

Also, it is preferable that the first lens unit be comprised of a positive lens, and particularly, to correct distortion as described above, it is desirable that the first lens unit be a positive lens having its convex surface facing the object side.

Conditional expression (7) is concerned in the refractive power of the third lens unit, and if the upper limit of this conditional expression is exceeded, the amount of movement for obtaining a desired magnification change ratio will become great and the zoom lens will become bulky, and this is not preferable. Also, if the lower limit of this conditional expression is exceeded, the refractive power of the third lens unit will become strong and the image plane will tend to become under or the back focal length at the wide angle end will become short, and there will be no room for containing a glass black such as a filter. Further, the principal ray will not perpendicularly (telecentrically) enter an imaging element such as a CCD and it will cause so-called shading, and this is not preferable.

Conditional expression (8) prescribes the ratio of the principal point spacing between the first lens unit and the second lens unit to the focal length at the wide angle end, and is a condition for achieving the compactness of the zoom lens system and yet maintaining good aberrations.

Further, when the focal length of the whole system at the telephoto end is $F_T$, it is desirable in the relation to conditional expression (6) to provide such a degree of focal length that satisfies the following conditional expression:

$$F_1<30F_T \tag{9}$$

If the upper limit of this conditional expression is exceeded, the full length of the zoom lens will increase, and this is not preferable. If the lower limit of this conditional expression is exceeded, the correction of coma will become particularly difficult.

Finally, to reduce the number of lenses in the zoom lens according to the present invention and yet maintain good aberrations, it is desirable that the first lens unit be comprised of a single positive lens having its convex surface facing the object side in order to correct effectively correct distortion by the first lens unit, and for the same purpose, a fixed stop be disposed between the second lens unit and the third lens unit.

The focusing of the zoom lens of the present invention can be accomplished by moving any of the first, second and third lens units.

The numerical value embodiments of the present invention will be shown below. In the numerical value embodiments below, ri represents the radius of curvature of the ith lens surface from the object side, di represents the thickness and air gap of the ith lens from the object side, and ni and $\mu$i represent the refractive index and Abbe number, respectively of the glass of the ith lens from the object side. $R_{28}$ and $R_{29}$ are face plates, filters or the like.

Also, the relations between the aforementioned conditional expressions and the numerical values in the numerical value embodiments will be shown in Table 1 below.

When the direction of the optical axis is X-axis and the direction perpendicular to the optical axis is H-axis and the direction of travel of light is positive and paraxial radii of curvature B, C, D and E are aspherical surface coefficients, the aspherical surface shape is indicated by the following equation:

$$X = \frac{(1/R_0)H^2}{1 + \sqrt{1 - (H/R_0)^2}} + BH^4 + CH^6 + DH^8 + EH^{10}$$

Embodiment 1
f = 1 to 3.0     fno = 1:(2.49 to 3.6)     2ω = 74.5° to 28.5°

| | | | |
|---|---|---|---|
| r1 = 5.935 | d1 = 0.72 | n1 = 1.51633 | υ1 = 64.2 |
| r2 = 114.032 | d2 = changeable | | |
| r3 = 3.497 | d3 = 0.24 | n2 = 1.77250 | υ2 = 49.6 |
| r4 = 1.147 | d4 = 0.58 | | |
| r5 = −4.799 | d5 = 0.19 | n3 = 1.80400 | υ3 = 46.6 |
| r6 = 2.491 | d6 = 0.25 | | |
| r7 = 2.433 | d7 = 0.53 | n4 = 1.69895 | υ4 = 30.1 |
| r8 = −51.970 | d8 = changeable | | |
| r9 = (stop) | d9 = changeable | | |
| r10 = 6.674 | d10 = 0.33 | n5 = 1.83481 | υ5 = 42.7 |
| r11 = −6.674 | d11 = 0.04 | | |
| r12 = 1.540 | d12 = 0.58 | n6 = 1.72000 | υ6 = 50.3 |
| r13 = 6.308 | d13 = 0.07 | | |
| r14 = −7.120 | d14 = 0.33 | n7 = 1.84666 | υ7 = 23.8 |
| r15 = 1.423 | d15 = 0.12 | | |
| r16 = 5.516 | d16 = 0.62 | n8 = 1.80400 | υ8 = 46.6 |
| r17 = −2.394 | d17 = changeable | | |
| G { r18 = ∞ | d18 = 1.19 | n9 = 1.51633 | υ9 = 64.2 |
| r19 = ∞ | | | |

| | FOCAL LENGTH | | |
|---|---|---|---|
| CHANGEABLE INTERVAL | W 1.00 | M 2.39 | T 2.99 |
| d2 | 0.24 | 1.80 | 1.79 |
| d8 | 1.93 | 0.36 | 0.38 |
| d9 | 1.93 | 0.88 | 0.33 |
| d17 | 0.71 | 1.77 | 2.31 |

Embodiment 2
f = 1 to 2.92     fno = 1:(2.30 to 3.30)     2ω = 64.2° to 24.2°

| | | | |
|---|---|---|---|
| r1 = 3.578 | d1 = 0.47 | n1 = 1.51633 | υ1 = 64.2 |
| r2 = 21.337 | d2 = changeable | | |
| r3 = 3.688 | d3 = 0.20 | n2 = 1.83481 | υ2 = 42.7 |
| r4 = 1.006 | d4 = 0.34 | | |
| r5 = −4.683 | d5 = 0.16 | n3 = 1.83481 | υ3 = 42.7 |
| r6 = 2.112 | d6 = 0.18 | | |
| r7 = 2.046 | d7 = 0.39 | n4 = 1.69895 | υ4 = 30.1 |
| r8 = −7.857 | d8 = changeable | | |
| r9 = (stop) | d9 = changeable | | |
| r10 = 6.793 | d10 = 0.29 | n5 = 1.83400 | υ5 = 37.2 |
| r11 = −6.793 | d11 = 0.03 | | |
| r12 = 1.171 | d12 = 0.41 | n6 = 1.72000 | υ6 = 50.3 |
| r13 = 13.242 | d13 = 0.04 | | |
| r14 = −9.959 | d14 = 0.43 | n7 = 1.84666 | υ7 = 23.8 |
| r15 = 0.976 | d15 = 0.11 | | |
| r16 = 3.088 | d16 = 0.33 | n8 = 1.83481 | υ8 = 42.7 |
| r17 = −3.088 | d17 = changeable | | |

-continued $$X = \frac{(1/R_0)H^2}{1 + \sqrt{1 - (H/R_0)^2}} + BH^4 + CH^6 + DH^8 + EH^{10}$$

| | | | |
|---|---|---|---|
| G { r18 = ∞ | d18 = 0.98 | n9 = 1.51633 | υ9 = 64.2 |
| r19 = ∞ | | | |

| | FOCAL LENGTH | | |
|---|---|---|---|
| CHANGEABLE INTERVAL | W 1.00 | M 2.34 | T 2.92 |
| d2 | 0.20 | 1.46 | 1.50 |
| d8 | 1.59 | 0.33 | 0.30 |
| d9 | 1.44 | 0.67 | 0.28 |
| d17 | 0.59 | 1.36 | 1.75 |

Embodiment 3
f = 1 to 1.61     fno = 1:(2.09 to 2.91)     2ω = 63.7° to 29.6°

| | | | |
|---|---|---|---|
| r1 = 17.554 | d1 = 0.31 | n1 = 1.51633 | υ1 = 64.2 |
| r2 = 263.217 | d2 = changeable | | |
| r3 = 2.789 | d3 = 0.19 | n2 = 1.80400 | υ2 = 46.6 |
| r4 = 1.233 | d4 = 0.44 | | |
| r5 = −42.527 | d5 = 0.16 | n3 = 1.80400 | υ3 = 46.6 |
| r6 = 1.952 | d6 = 0.17 | | |
| r7 = 1.886 | d7 = 0.41 | n4 = 1.68893 | υ4 = 31.1 |
| r8 = 17.734 | d8 = changeable | | |
| r9 = (stop) | d9 = changeable | | |
| r10 = 5.212 | d10 = 0.31 | n5 = 1.83481 | υ5 = 42.7 |
| r11 = −5.212 | d11 = 0.03 | | |
| r12 = 1.251 | d12 = 0.45 | n6 = 1.71300 | υ6 = 53.8 |
| r13 = 12.044 | d13 = 0.03 | | |
| r14 = −14.574 | d14 = 0.56 | n7 = 1.84666 | υ7 = 23.8 |
| r15 = 0.930 | d15 = 0.14 | | |
| r16 = 3.101 | d16 = 0.41 | n8 = 1.80400 | υ8 = 46.6 |
| r17 = −3.100 | d17 = changeable | | |
| G { r18 = ∞ | d18 = 0.97 | n9 = 1.51633 | υ9 = 64.2 |
| r19 = ∞ | | | |

| | FOCAL LENGTH | | |
|---|---|---|---|
| CHANGEABLE INTERVAL | W 1.00 | M 2.36 | T 1.61 |
| d2 | 0.17 | 1.95 | 1.48 |
| d8 | 2.03 | 0.26 | 0.73 |
| d9 | 1.15 | 0.27 | 0.76 |
| d17 | 0.19 | 1.07 | 0.58 |

Embodiment 4
f = 1 to 3.98     fno = 1:(2.3 to 3.6)     2ω = 74.4° to 21.6°

| | | | |
|---|---|---|---|
| r1 = 5.381 | d1 = 0.99 | n1 = 1.51633 | υ1 = 64.2 |
| r2 = 39.933 | d2 = changeable | | |
| r3 = 3.995 | d3 = 0.24 | n2 = 1.77250 | υ2 = 49.6 |
| r4 = 1.317 | d4 = 0.73 | | |
| r5 = −6.892 | d5 = 0.19 | n3 = 1.80400 | υ3 = 46.6 |
| r6 = 2.434 | d6 = 0.23 | | |
| r7 = 2.412 | d7 = 0.53 | n4 = 1.69895 | υ4 = 30.1 |
| r8 = 47.272 | d8 = changeable | | |
| r9 = (stop) | d9 = changeable | | |
| r10 = 7.011 | d10 = 0.32 | n5 = 1.80400 | υ5 = 46.6 |
| r11 = −7.011 | d11 = 0.04 | | |
| r12 = 1.440 | d12 = 0.62 | n6 = 1.69680 | υ6 = 55.5 |
| r13 = 5.617 | d13 = 0.08 | | |
| r14 = −9.201 | d14 = 0.24 | n7 = 1.84666 | υ7 = 23.8 |
| r15 = 1.364 | d15 = 0.14 | | |
| r16 = 5.547 | d16 = 0.55 | n8 = 1.83400 | υ8 = 37.2 |
| r17 = −2.806 | d17 = changeable | | |
| G { r18 = ∞ | d18 = 1.19 | n9 = 1.51633 | υ9 = 64.2 |
| r19 = ∞ | | | |

-continued $$X = \frac{(1/R_0)H^2}{1 + \sqrt{1 - (H/R_0)^2}} + BH^4 + CH^6 + DH^8 + EH^{10}$$

| CHANGEABLE INTERVAL | FOCAL LENGTH | | |
|---|---|---|---|
| | W | M | T |
| | 1.00 | 3.11 | 3.98 |
| d2 | 0.24 | 2.58 | 2.54 |
| d8 | 2.68 | 0.34 | 0.38 |
| d9 | 2.20 | 0.95 | 0.31 |
| d17 | 0.71 | 1.96 | 2.61 |

Embodiment 5
f = 5.15 to 12.12    FNO = 2 to 2.8    2ω = 60.4° to 27.8°

| | | | |
|---|---|---|---|
| r1 = 93.483 | d1 = 1.60 | n1 = 1.51633 | υ1 = 64.2 |
| r2 = 279.352 | d2 = changeable | | |
| *r3 = −202.847 | d3 = 1.00 | n2 = 1.80400 | υ2 = 46.6 |
| r4 = 6.116 | d4 = 2.09 | | |
| r5 = 9.395 | d5 = 1.90 | n3 = 1.67270 | υ3 = 32.1 |
| r6 = 28.200 | d6 = changeable | | |
| r7 = (stop) | d7 = changeable | | |
| r8 = 26.334 | d8 = 1.60 | n4 = 1.83481 | υ4 = 42.7 |
| r9 = −26.636 | d9 = 0.15 | | |
| r10 = 6.569 | d10 = 2.30 | n5 = 1.71300 | υ5 = 53.8 |
| r11 = 72.494 | d11 = 0.15 | | |
| r12 = −75.741 | d12 = 2.87 | n6 = 1.84666 | υ6 = 23.8 |
| r13 = 4.789 | d13 = 0.72 | | |
| r14 = 14.872 | d14 = 2.10 | n7 = 1.80400 | υ7 = 46.6 |
| r15 = −17.513 | d15 = changeable | | |
| r16 = ∞ | d16 = 5.00 | n8 = 1.51633 | υ8 = 64.2 |
| r17 = ∞ | | | |

| CHANGEABLE INTERVAL | FOCAL LENGTH | |
|---|---|---|
| | W | T |
| | 5.15 | 12.12 |
| d2 | 3.18 | 13.45 |
| d8 | 11.56 | 1.29 |
| d9 | 5.92 | 1.55 |
| d17 | 1.00 | 5.36 |

Third Surface: Aspherical Surface $R_0 = -202.847$, $B = 2.010 \times 10^{-4}$, $C = -6.716 \times 10^{-7}$, -continued $$X = \frac{(1/R_0)H^2}{1 + \sqrt{1 - (H/R_0)^2}} + BH^4 + CH^6 + DH^8 + EH^{10}$$

$D = -5.130 \times 10^{-10}$, $E = -1.396 \times 10^{-10}$

Embodiment 6
f = 5.15 to 12.39    FNO = 1:(2 to 2.8)    2ω = 60.4° to 27.2°

| | | | |
|---|---|---|---|
| r1 = 55.506 | d1 = 1.60 | n1 = 1.51633 | υ1 = 64.2 |
| r2 = −171.365 | d2 = changeable | | |
| r3 = 14.530 | d3 = 1.00 | n2 = 1.80400 | υ2 = 46.6 |
| r4 = 6.071 | d4 = 2.28 | | |
| r5 = −443.467 | d5 = 0.80 | n3 = 1.80400 | υ3 = 46.6 |
| r6 = 9.031 | d6 = 0.88 | | |
| r7 = 8.921 | d7 = 2.10 | n4 = 1.68893 | υ4 = 31.1 |
| r8 = 59.057 | d8 = changeable | | |
| r9 = (stop) | d9 = changeable | | |
| *r10 = 7.139 | d10 = 2.30 | n5 = 1.80400 | υ5 = 46.6 |
| r11 = −42.369 | d11 = 0.15 | | |
| r12 = −93.663 | d12 = 2.87 | n6 = 1.84666 | υ6 = 23.8 |
| r13 = 6.292 | d13 = 0.72 | | |
| r14 = 18.851 | d14 = 2.10 | n7 = 1.80400 | υ7 = 46.6 |
| r15 = −11.000 | d15 = changeable | | |
| r16 = ∞ | d16 = 5.00 | n8 = 1.51633 | υ8 = 64.2 |
| r17 = ∞ | | | |

| CHANGEABLE INTERVAL | FOCAL LENGTH | |
|---|---|---|
| | W | M |
| | 5.15 | 12.39 |
| d2 | 2.89 | 12.17 |
| d8 | 10.66 | 1.38 |
| d9 | 5.92 | 1.80 |
| d17 | 1.00 | 5.12 |

Tenth Surface: Aspherical Surface $R_0 = 7.139$, $B = -3.828 \times 10^{-4}$, $C = -6.742 \times 10^{-7}$,
$D = 1.339 \times 10^{-7}$, $E = -1.787 \times 10^{-8}$

TABLE 1

| | Embodiment 1 | Embodiment 2 | Embodiment 3 | Embodiment 4 | Embodiment 5 | Embodiment 6 |
|---|---|---|---|---|---|---|
| Cond. Ex. (1): $Z_3/Z_2$ | 2.089 | 1.804 | 2.117 | 2.173 | 2.168 | 1.793 |
| Cond. Ex. (2): $\|F_2/F_W\|$ | 1.710 | 1.580 | 2.370 | 1.854 | 2.574 | 2.081 |
| Cond. Ex. (3): $\|M_2\|/(F_T-F_W)$ | 0.779 | 0.698 | 1.310 | 0.771 | 1.474 | 1.281 |
| Cond. Ex. (4): $\|M_3\|/(F_T-F_W)$ | 0.806 | 0.625 | 0.648 | 0.635 | 0.625 | 0.568 |
| Cond. Ex. (5): $\|M_2/M_3\|$ | 0.967 | 1.117 | 2.023 | 1.214 | 2.357 | 2.256 |
| Cond. Ex. (6): $F_1/F_W$ | 12.09 | 8.237 | 36.41 | 11.93 | 52.73 | 15.81 |
| Cond. Ex. (7): $F_3/F_W$ | 2.347 | 1.935 | 1.850 | 2.449 | 1.851 | 1.9297 |
| Cond. Ex. (8): $E_{1W}/F_W$ | 0.940 | 0.596 | 0.593 | 1.404 | 0.830 | 0.915 |
| Cond. Ex. (9): $F_1/F_T$ | 4.03 | 2.826 | 15.46 | 2.995 | 22.39 | 6.56 |

What is claimed is:

1. A zoom lens consisting of, in succession from an object side, a first lens unit having positive refractive power and consisting of a single positive lens element, a second lens unit having negative refractive power, and a third lens unit having positive refractive power, said second lens unit and said third lens unit being moved to thereby effect zooming, said zoom lens satisfying the following condition:

$$0.5<|M_3|/(F_T-F_W)<1.0,$$

wherein $M_3$ is an amount of movement of zooming from a wide angle end to a telephoto end of said third lens unit and $F_W$ and $F_T$ are respectively focal lengths of said zoom lens at the wide angle end and the telephoto end.

2. The zoom lens according to claim 1 satisfying the following condition:

$$1.4<|F_2/F_W|<2.6,$$

where $F_2$ is the focal length of said second lens unit.

3. The zoom lens according to claim 2 satisfying the following condition:

$$0.5<|(M_2|/(F_T-F_W)<1.6,$$

where $F_T$ is the focal length of said zoom lens at the telephoto end, and $|M_2|$ is the amount of zoom movement of said second lens unit from the wide angle end to the telephoto end.

4. The zoom lens according to claim 1 satisfying the following conditions:

$$5<F_1/F_W<53$$

$$1<F_3/F_W<3,$$

where $F_1$ and $F_3$ are respectively the focal lengths of said first and third lens units.

5. The zoom lens according to claim 4 satisfying the following condition:

$$0.4<E_{1W}/F_W<1.8,$$

where $E_{1W}$ is the principal point distance between said first lens unit and said second lens unit at the wide angle end.

6. The zoom lens according to claim 1 satisfying the following condition:

$$0.7<|M_2/M_3|<2.5,$$

where $M_2$ and $M_3$ are respectively the amounts of movement of said second and third lens units from the wide angle end to the telephoto end.

7. A zoom lens consisting of, in succession from an object side, a first lens unit consisting of a single lens element having positive refractive power, a second lens unit having negative refractive power, and a third lens unit having positive refractive power, said second lens unit and said third lens unit being moved to thereby effect magnification change.

8. The zoom lens according to claim 7 satisfying the following condition:

$$1.4<|F_2/F_W|<2.6,$$

where $F_2$ is the focal length of said second lens unit, and $F_W$ is the focal length of said zoom lens at the wide angle end.

9. The zoom lens according to claim 7 satisfying the following condition:

$$0.4<E_{1W}/F_W<1.8,$$

where $E_{1W}$ is the principal point distance between said first lens unit and said second lens unit at the wide angle end, and $F_W$ is the focal length of the whole system at the wide angle end.

10. The zoom lens according to claim 7 satisfying the following condition:

$$0.7<|M_2/M_3|<2.5,$$

where $M_2$ and $M_3$ are respectively the amounts of movement of said second and third lens units from the wide angle end to the telephoto end.

11. The zoom lens of claim 7 wherein the object side surface of said single lens element is shaped as being convex toward the object side.

12. A zoom lens according to claim 7, wherein when the magnification change is effected, said second lens unit and said third lens unit are moved in opposite directions.

13. A zoom lens consisting of, in succession from an object side, a first lens unit consisting of a single lens element having positive refractive power, a second lens unit having negative refractive power, a stop, and a third lens unit having positive refractive power, said second lens unit and said third lens unit being moved to thereby effect magnification change.

14. A zoom lens according to claim 13, wherein when the magnification change is effected, said second lens unit and said third lens unit are moved in opposite directions.

15. A zoom lens comprising, in succession from an object side, a first lens unit having positive refractive power and consisting of a single positive lens element, a second lens unit having negative refractive power, and a third lens unit having positive refractive power, said second lens unit and said third lens unit being moved to thereby effect zooming, and said zoom lens satisfying the following condition:

$$0.5<|M_3|/(F_T-F_W)<1.0,$$

wherein $M_3$ is an amount of movement of zooming from a wide angle end to a telephoto end of said third lens unit, and $F_W$ and $F_T$ are respectively focal lengths of said zoom lens at the wide angle end and the telephoto end.

16. A zoom lens comprising, in succession from an object side, a first lens unit consisting of a single lens element having positive refractive power, a second lens unit having negative refractive power, and a third lens unit having positive refractive power, said second lens unit and said third lens unit being moved to thereby effect magnification change, said zoom lens further comprising a stop disposed between said second lens unit and said third lens unit.

17. The zoom lens of claim 16, wherein the object side surface of said single lens element is shaped as being convex toward the object side.

18. A zoom lens according to claim 16, wherein when the magnification change is effected, said second lens unit and said third lens unit are moved in opposite directions.

19. A zoom lens comprising, in succession from an object side, a first lens unit consisting of a single lens element having positive refractive power, a second lens unit having negative refractive power, and a third lens unit having positive refractive power, said second lens unit and said third lens unit being moved to thereby effect magnification change, wherein said third lens unit has three or more lens elements.

* * * * *

UNITED STATES PATENT AND TRADEMARK OFFICE
CERTIFICATE OF CORRECTION

PATENT NO.   : 6,104,548
DATED        : August 15, 2000
INVENTOR(S)  : Nakayama et al.

It is certified that error appears in the above-identified patent and that said Letters Patent is hereby corrected as shown below:

Column 5,
Line 1, "$\mu i$" should read -- vi --.

Column 9,
Line 23, "$0.5 < | (M_2 | / (F_T - F_W) < 1.6$," should read -- $0.5 < | M_2 | / (F_T - F_W) < 1.6$, --.

Signed and Sealed this

Twenty-third Day of October, 2001

Attest:

*Nicholas P. Godici*

NICHOLAS P. GODICI
*Attesting Officer*    *Acting Director of the United States Patent and Trademark Office*